UNITED STATES PATENT OFFICE.

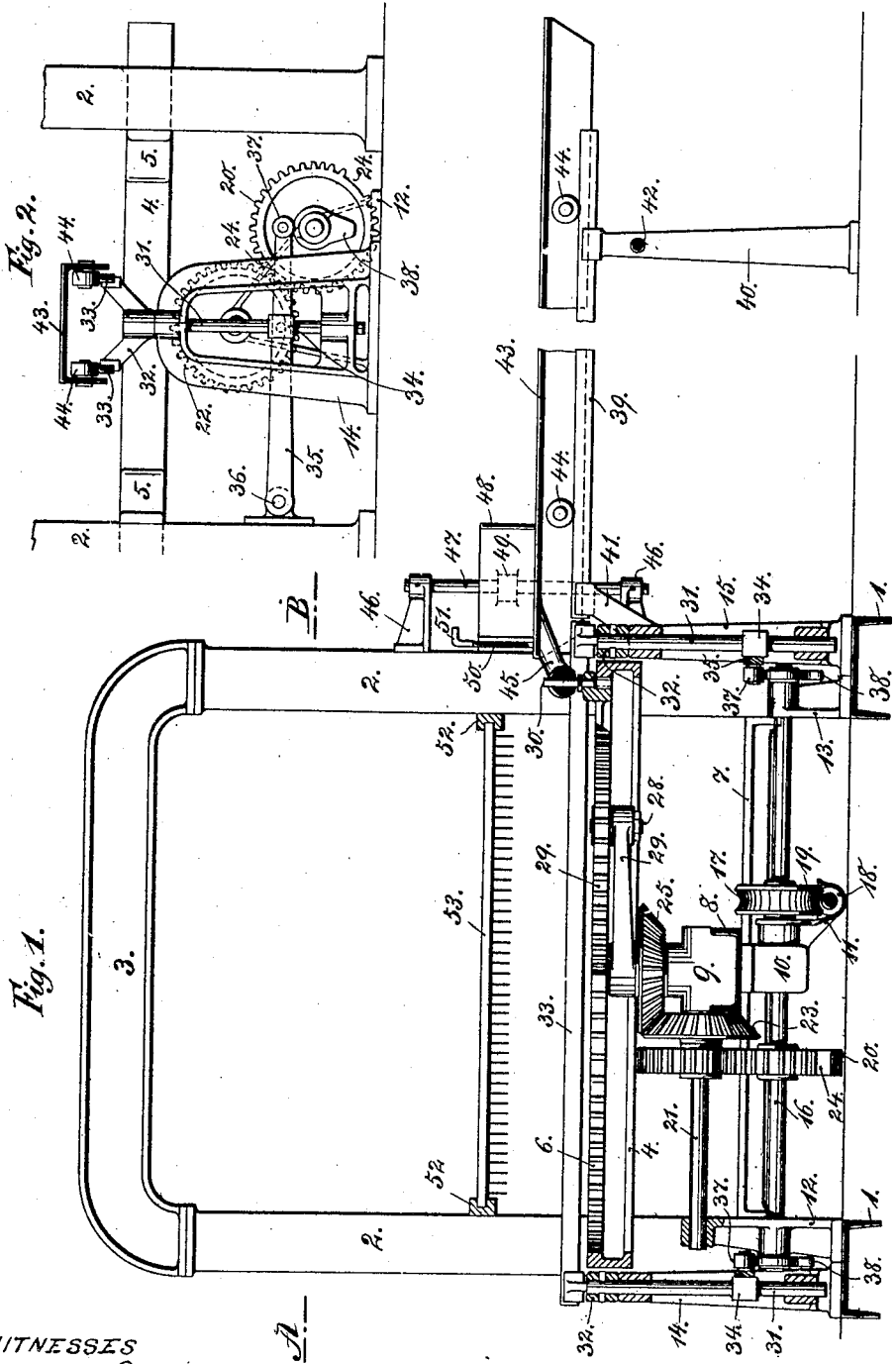

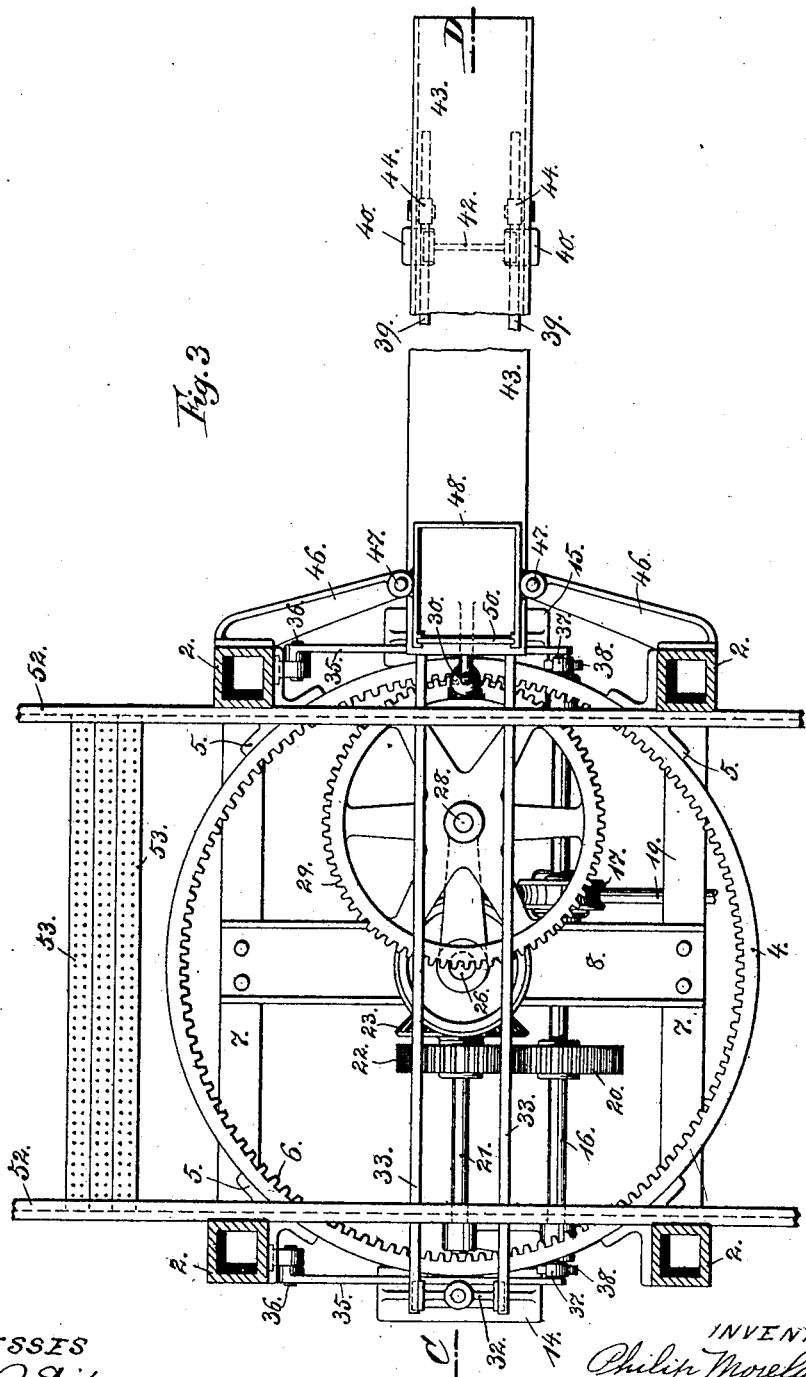

PHILIP MORELAND, OF GLOUCESTER, ENGLAND, AND OTTO H. LANDVATTER, OF DURLACH, GERMANY, ASSIGNORS TO BADISCHE MASCHINENFABRIK UND EISENGIESSEREI, VORMALS G. SEBOLD UND SEBOLD & NEFF, OF DURLACH, GERMANY.

DIPPING DEVICE FOR MATCH-MAKING MACHINES.

No. 869,641.  Specification of Letters Patent.  Patented Oct. 29, 1907.

Application filed November 27, 1906. Serial No. 345,396.

*To all whom it may concern:*

Be it known that we, PHILIP MORELAND, a subject of the King of Great Britain and Ireland, residing at Gloucester, England, and OTTO H. LANDVATTER, a citizen of the Confederation of Switzerland, residing at Durlach, in the Empire of Germany, have invented a new and useful Dipping Device for Match-Machines, of which the following is a specification.

Our invention has for its object a dipping device for match-machines, which as far as possible imitates the hand-work formerly employed for dipping the ends of match-splints in the viscous igniting-material and thus produces uniformly good heads on the matches.

We will now proceed to describe our invention with reference to the accompanying drawings, in which—

Figure 1 is a vertical longitudinal section through a dipping device on the line C—D in Fig. 3, Fig. 2 is a side view of the lower part of same, when looked at from left to right in Fig. 1, and Fig. 3 is a horizontal section through the line A—B in Fig. 1.

Similar characters of reference refer to similar parts throughout the several views.

On suitable base plates 1, 1 four standards 2, 2 are mounted, which at their upper ends may be connected with one another in pairs by means of cross pieces 3. Between the four standards 2, 2 is disposed a ring 4, which may be secured on them by means of angular pieces 5, 5 and is provided with an inwardly projecting and internally toothed rim 6.

Two parallel cross beams 7, 7 are secured between the four standards 2, 2 and a supporting beam 8 is fastened on them. This supporting beam 8 may be in one piece with a bearing 9, while to its bottom another bearing 10 with an arm 11 may be attached. On the base plates 1, 1 between the standards 2, 2 are fastened two journals 12 and 13 and two supports 14 and 15. A horizontal shaft 16 is mounted to turn in the journals 12 and 13 and in the bearing 10 and has fastened on it a worm wheel 17 and a gear wheel 20. The worm wheel 17 meshes with a worm 18 on a shaft 19, which latter is mounted to turn in the arm 11 and is driven from without in any known manner. The gear wheel 20 has in its teeth two opposite gaps 24, 24, the purpose of which will be explained later on. A shaft 21 is mounted to turn in the journal 12 and in the bearing 9 and has fastened on it a gear wheel 22 and a bevel wheel 23. The gear wheel 22 meshes with the gear wheel 20 already mentioned and the bevel wheel 23 meshes with a like bevel wheel 25 fastened on a vertical shaft 26, which latter is mounted to turn in the bearing 9 and has fastened on it a crank 27. A planet-wheel 29 is mounted to turn on the crank-pin 28 and meshes with the internally toothed rim 6. The planet-wheel 29 is provided on its rim with a projection, in which a vertical pin 30 is fastened. As the diameter of the pitch-circle of the planet-wheel 29 is like the radius of the pitch-circle of the internally toothed rim 6 and as the axis of the pin 30 passes through the pitch-circle of the planet-wheel 29, it will be understood, that during the rotation of the crank 27 and the rolling of the planet-wheel 29 inside the internally toothed rim 6 the pin 30 will be moved in a straight line through a path like the diameter of the rim 6 in one direction and back in the same straight line, while its speed varies, as is well known.

Two vertical rods 31, 31 are longitudinally guided in the two supports 14 and 15 and carry at their upper ends two crossheads 32, 32, on which two parallel rails 33, 33 are fastened. Two square blocks 34, 34 are fastened on the rods 31, 31 and are provided with pins, which engage in holes of two levers 35, 35 that are fulcrumed on two standards 2, 2 at 36. The free ends of the levers 35, 35 are provided with pins on which rollers 37, 37 are mounted to turn. At the ends of the shaft 16 without the journals 12 and 13 are fastened two cam disks 38, 38, on which the two rollers 37, 37 are adapted to roll. It will be understood, that the two cam disks 38, 38 are adapted to raise and to lower the two rails 33, 33. Two other rails 39, 39 in line with the rails 33, 33 in their normal lowest position are fastened on two pillars 40, 40 and on two arms 41 provided on the support 15 and the two pillars 40, 40 are connected together by means of a stay 42. A carriage comprising a table 43 and four wheels 44, 44 is adapted to run on the rails 39, 33, 39, 33. The table 43 is provided with an arm 45, in which the pin 30 engages, so that thereby the carriage is pivotally connected with the planet-wheel 29. Of course the pin 30 is so disposed on the planet-wheel 29 that it is capable of moving the carriage in the direction of the rails 33, 39, 33, 39.

Four arms 46, 46 are secured on two standards 2, 2 and are arranged to hold two vertical rods 47, 47 on both sides of the carriage. A receptacle 48 is vertically guided on the two rods 47, 47 by means of eyes 49 and is adapted to bear on the table 43. The receptacle 48 is a box open at top and bottom with a slide 50 in front of the toothed rim 6. The receptacle 48 is to receive the viscous igniting material and the slide 50 can be vertically adjusted by means of its handle 51, so as to leave between its lower edge and the table 43 a more or less narrow slit, through which the igniting material can pass while it is being spread on the table 43 during the motion of the carriage from right to left in Fig. 1. The slide 50 is secured in its adjusted position merely by its friction on its guides. The table 43 is made so long as to still close the bottom of the receptacle 48 when it occupies its extreme position on the left in Fig. 1. Fastened on the four standards 2, 2 are two horizontal rails 52, 52 in which the match-splint carriers 53, 53 of any known construction are guided, they being moved by hand or mechanically, as the case may be. The cams on the cam disks 38, 38 and the two levers 35, 35 are so proportioned as to raise the two rails 33, 33 with the carriage so much, that the lower ends of the match-splints can sufficiently dip in the layer of viscous igniting material on the table 43.

The two gear wheels 20 and 22 are so proportioned and the gaps 24, 24 on the gear wheel 20 are so disposed as to cause the carriage to pause for a short time in its two extreme positions during the continuous motion of the worm-shaft 19.

The dipping device operates as follows: The carriers 53, 53 charged with match-splints are introduced into the guides 52, 52 from one side, say from the rear in Fig. 1 and from above in Fig. 3 and a convenient number of them, say three or four, are pushed by hand to the position above the path of the carriage, when the latter has been moved outwards to the right in Fig. 1 or is about to be moved inwards. The carriage then rapidly moves inwards while the viscous igniting material is being spread on the table 43 from the receptacle 48, afterwards the carriage stays in the extreme inward position, while it is being raised by means of the two rails 33, 33 from the cam disks 38, 38 to effect the dipping of the match-splints and thereupon it is again lowered, whereupon it rapidly returns to its initial position outside the standards 2, 2 and remains here for the table 43 to be cleaned. The carriers 53, 53 with the dipped match-splints are pushed to the other side and fresh splint-carriers 53, 53 are pushed forward to replace them, after which the occurrences described will repeat.

The receptacle 48 is preferably made small, so that the igniting material remains fresh and can neither dry up nor otherwise change.

The dipping device described may be varied in many respects without departing from the spirit of our invention.

We claim:

1. In a dipping device for match-machines, the combination with a frame, of a table, means for moving said table in a direction into and out of said frame, means for reciprocating said table in said frame in a direction at right angles to its surface, and a receptacle for igniting material guided in said frame at right angles to said table while bearing on same and adapted to spread thereon a layer during the motion of same, said frame being adapted for guiding match-splint carriers over said table, so that the ends of the splints may dip in the layer of igniting material.

2. In a dipping device for match-machines, the combination with a frame, of a table, means for moving said table in a direction into and out of said frame, means for reciprocating said table in said frame in a direction at right angles to its surface, and a receptacle for igniting material open above and below and guided in said frame at right angles to said table while bearing on same and adapted to spread thereon a layer during the motion of same, it being provided with a slide whereby a slit between the slide and the table may be formed and adjusted, said frame being adapted for guiding match-splint carriers over said table, so that the ends of the splints may dip in the layer of igniting material.

3. In a dipping device for match-machines, the combination with a frame, of a table, means for horizontally moving said table into and out of said frame, means for raising and lowering said table in said frame, and a receptacle for igniting material vertically guided in said frame while bearing on said table and adapted to spread thereon a layer during the motion of same, said frame being adapted for horizontally guiding match-splint carriers over said table, so that the ends of the splints may dip in the layer of igniting material.

4. In a dipping device for match-machines, the combination with a frame, of a table, means for horizontally moving said table into and out of said frame, means for raising and lowering said table in said frame, and a receptacle for igniting material open above and below and vertically guided in said frame while bearing on said table and adapted to spread thereon a layer during the motion of same, said receptacle being provided with a slide whereby a slit between the slide and the table may be formed and adjusted, and said frame being adapted for horizontally guiding match-splint carriers over said table, so that the ends of the splints may dip in the layer of igniting material.

5. In a dipping device for match-machines, the combination with a frame, of a table, means for horizontally moving said table into and out of said frame while permitting it to pause at the end of each stroke, means for raising and lowering said table in said frame during the pause at the end of the inward stroke, and a receptacle for igniting material open above and below and vertically guided in said frame while bearing on said table and adapted to spread thereon a layer during the motion of same, said receptacle being provided with a slide whereby a slit between the slide and the table may be formed and adjusted, and said frame being adapted for horizontally guiding match-splint carriers over said table, so that the ends of the splints may dip in the layer of igniting material.

6. In a dipping device for match-machines, the combination with a frame, of an internally toothed ring horizontally disposed in said frame, a planet-wheel having a diameter like half that of the pitch-circle of said internally toothed ring and adapted to roll on same, means for rotating said planet-wheel, a vertical pin on said planet-wheel in its pitch-circle, two parallel rails over said internally toothed ring and vertically guided in said frame, means for raising and lowering said two parallel rails, two stationary rails in line with said two parallel rails in their lowest position, a carriage comprising a horizontal table in which said vertical pin engages for moving the carriage over said two parallel rails and back over said two stationary rails, and a receptacle for igniting material vertically guided in said frame while bearing on the table of said carriage and adapted to spread thereon a layer during the motion of same, said frame being adapted for horizontally guiding match-splint carriers over said carriage, so that the ends of the splints may dip in the layer of igniting material.

7. In a dipping device for match-machines, the combination with a frame, of an internally toothed ring horizontally disposed in said frame, a planet-wheel having a diameter like half that of the pitch-circle of said internally toothed ring, a vertical shaft mounted to turn in said frame in the axis of said internally toothed ring, a crank fastened on said vertical shaft and having a pin on which said planet-wheel is mounted to turn while meshing with said internally toothed ring, a vertical pin on said planet-wheel in its pitch-circle, two parallel rails over said internally toothed ring and vertically guided in said frame, two stationary rails in line with said two parallel rails in their lowest position, a carriage comprising a horizontal table in which said vertical pin engages for moving the carriage over said two parallel rails and back over said two stationary rails, a receptacle for igniting material vertically guided in said frame while bearing on the table of said carriage and adapted to spread thereon a layer during the motion of same, means for rotating said vertical shaft while permitting it to pause at the end of each stroke of said carriage, and means for raising and lowering said two parallel rails with said carriage during the pause at the end of the inward stroke of same, said frame being adapted for horizontally guiding match-splint carriers over said carriage, so that the ends of the splints may dip in the layer of igniting material.

8. In a dipping device for match-machines, the combination with a frame, of an internally toothed ring horizontally disposed in said frame, a planet-wheel having a diameter like half that of the pitch-circle of said internally toothed ring, a vertical shaft mounted to turn in said frame in the axis of said internally toothed ring, a crank fastened on said vertical shaft and having a pin on which said planet-wheel is mounted to turn while meshing with said internally toothed ring, a vertical pin on said planet-wheel in its pitch-circle, two parallel rails over said internally toothed ring and vertically guided in said frame, two stationary rails in line with said two parallel rails in their lowest position, a carriage comprising a horizontal table in which said vertical pin engages for moving the carriage over said two parallel rails and back over said two stationary rails, a receptacle for igniting material open above and below and vertically guided in said frame while bearing on the table of said carriage and adapted to spread thereon a layer during the motion of same, said receptacle being provided with a slide whereby a slit between the slide and the table may be formed and adjusted, means for rotating said vertical shaft while permitting it to pause at the end of each stroke of said carriage, and, means for raising and lowering said two parallel rails with said carriage during the pause at the end of the inward stroke of same, said frame being adapted for horizontally guiding match-splint carriers over said carriage, so that the ends of the splints may dip in the layer of igniting material.

9. In a dipping device for match-machines, the combination with a frame, of an internally toothed ring horizontally disposed in said frame, a planet-wheel having a diameter like half that of the pitch-circle of said internally toothed ring, a vertical shaft mounted to turn in said frame in the axis of said internally toothed ring, a crank fastened on said vertical shaft and having a pin on which said planet-wheel is mounted to turn while meshing with said internally toothed ring, a vertical pin on said planet-wheel in its pitch-circle, two parallel rails over said internally toothed ring and vertically guided in said frame, two stationary rails in line with said two parallel rails in their lowest position, a carriage comprising a horizontal table in which said vertical pin engages for moving the carriage over said two parallel rails and back over said two stationary rails, a receptacle for igniting material open above and below and vertically guided in said frame while bearing on the table of said carriage and adapted to spread thereon a layer during the motion of same, said receptacle being provided with a slide whereby a slit between the slide and the table may be formed and adjusted, a bevel wheel on said vertical shaft, a horizontal shaft mounted to turn in said frame, a second bevel wheel on said horizontal shaft and meshing with said bevel wheel, a gear wheel on said horizontal shaft, a horizontal cam shaft mounted in said frame to turn, a second gear wheel on said horizontal cam shaft and meshing with said gear wheel and having two opposite gaps in its teeth whereby said planet-wheel is caused to pause at the end of each stroke of said carriage, two cams on said horizontal cam shaft, means controlled from said two cams for raising and lowering said two parallel rails at the end of the inward stroke of said carriage, and means for driving said horizontal cam shaft, said frame being adapted for horizontally guiding match-splint carriers over said carriage, so that the ends of the splints may dip in the layer of igniting material.

In testimony whereof we have signed our names to this specification in the presence of two subscribing witnesses.

PHILIP MORELAND.
OTTO H. LANDVATTER.

Witnesses as to Philip Moreland:
F. JAKWAY,
J. A. PALIN.

Witnesses as to Otto H. Landvatter:
H. W. HARRIS,
JOS. H. LEUTE.